FIG_2
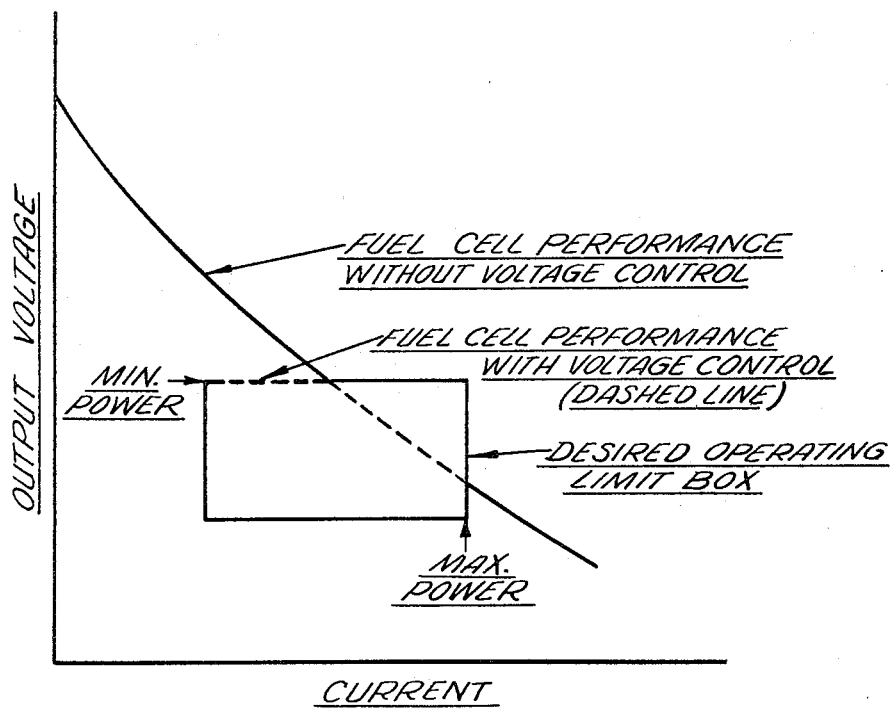
FIG_3
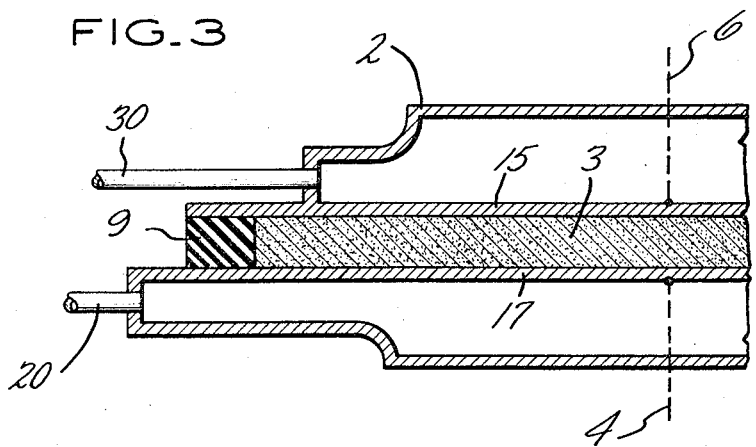
INVENTOR
MARTIN A. GAY
BY Charles A. Warren
ATTORNEY United States Patent Office 3,379,572
Patented Apr. 23, 1968

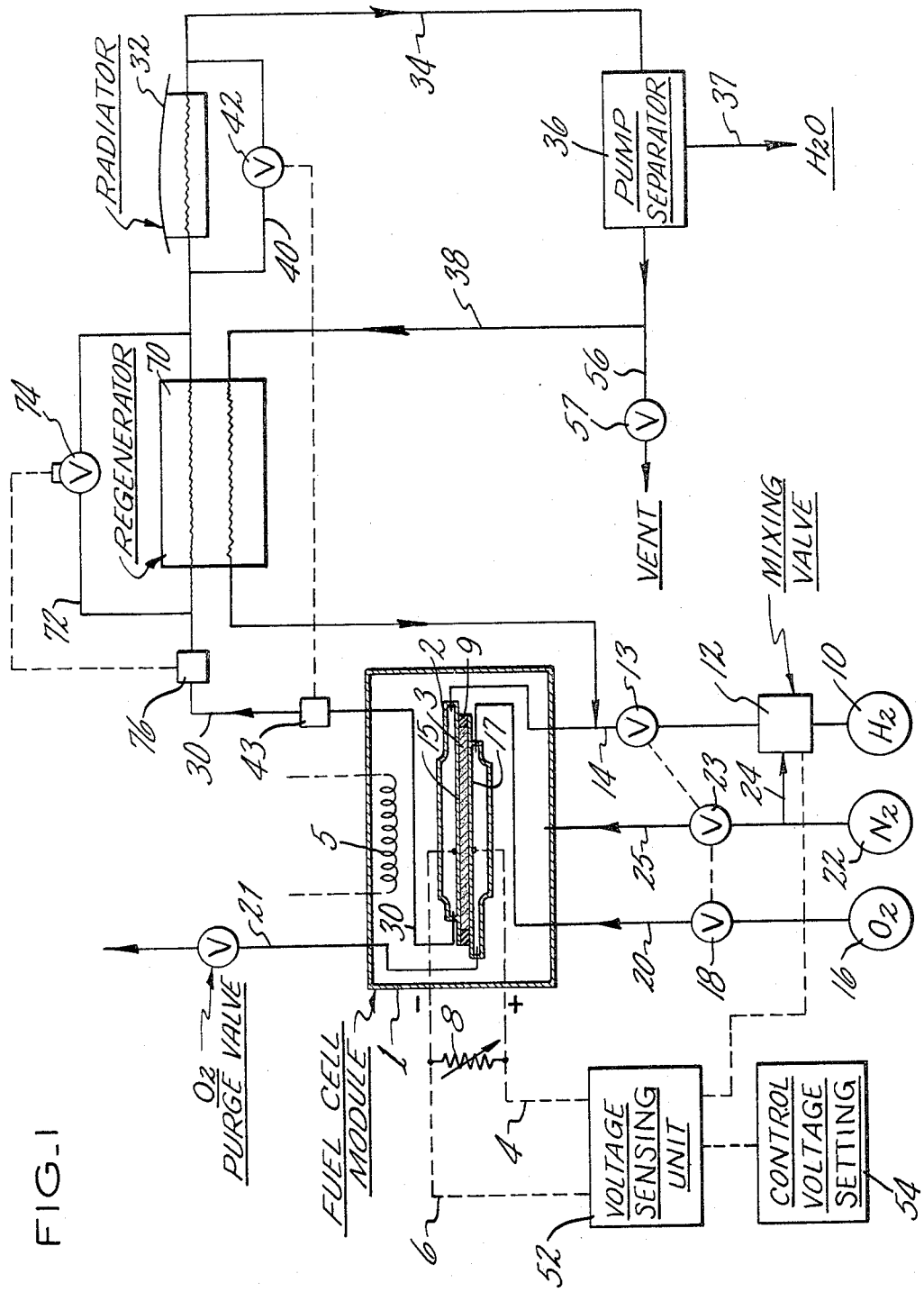

3,379,572
METHOD AND APPARATUS FOR LIMITING THE OUTPUT VOLTAGE OF A FUEL CELL
Martin A. Gay, Rockville, Conn., assignor to United Aircraft Corporation, East Hartford, Conn., a corporation of Delaware
Filed Aug. 4, 1964, Ser. No. 387,432
8 Claims. (Cl. 136—86)

ABSTRACT OF THE DISCLOSURE

A fuel cell system utilizing inert gas injection into the fuel supplied to the cell, and the consequent dilution thereof, in response to a signal from a voltage sensor, to regulate the output voltage of the cell and maintain a positive gas flow to the cell anode for by-product removal, particuarly at low cell power levels.

---

This invention relates to a fuel cell system in which the output voltage of the fuel cell is regulated by dilution of the fuel with inert gas. More particularly, it relates to a combined voltage-regulating and by-product removal means for a fuel cell system.

Fuel cells for the direct conversion of chemical energy to electrical energy are well known in the art. In a typical apparatus two or more porous, metallic electrodes are suspended in a liquid electrolyte. Fuel and oxidizer are introduced at separate electrodes and combined chemically, generating an electric current in the external circuit while forming a by-product such as water. The reactants are supplied continuously in accordance with the requirements of the external load.

Fuel entering the cell is ionized upon contact with the electrolyte within the porous negative electrode. In the process electrons are released which flow through the external circuit as usable current. Within the positive electrode, oxidant atoms acquire electrons and thus become negative ions. These ions migrate toward the negative electrode where they react with the positive fuel ions to form the exhaust product. The porous electrodes thus act as the site of the reactions of electron exchange.

It is known that the efficiency of a fuel cell is relatively dependent upon the active surface of the electrode exposed to the electrolyte in the region of the electron exchange. Typically, therefore, the liquid-gas interface in the fuel cell is maintained internal of the porous electrode. A gas pressure balance system may be utilized to maintain a very precise and slight pressure differential between the liquid electrolyte and the reactant gas at each electrode to position the liquid-gas interface within the electrode. Any substantial variation in this pressure differential will result in a shifting of the interface location. If the shifting of the interface is substantial, the output of the cell may be completely terminated.

In the normal operation of the fuel cell, particularly the hydrogen-oxygen cell, more fuel is circulated through the electrode than will be utilized within the cell and the excess of circulated fuel carries with it some of the chemical by-product generated within the cell. In the hydrogen-oxygen cell it is water vapor which is discharged with the excess fuel through a discharge conduit.

The fuel flow through the system is controlled as a function of the normal or desired electrical output from the cell. The rate of the chemical reaction within the cell is a function of the electrical load imposed thereon. As the electrical demand is decreased, the reaction rate correspondingly deceases without the need for external instrumental assistance. As may be seen in FIGURE 2, however, there is a substantial voltage increase associated with operation of the system at a reduced power level.

In order to limit the output voltage, the fuel and/or oxidant pressure may be decreased. This necessitates a corresponding decrease in the cover gas pressure imposed on the electrolyte to prevent shifting of the liquid-gas interface within the electrode. It may be seen, therefore, that the pressure reductions throughout the system must be completely coordinated. Considerable system complication is thereby made mandatory to accomplish the essential coordination of pressure changes required under the conditions of varying external load. The characteristics of the external electrical equipment or the structure of the fuel cell itself are frequently such that a maximum voltage is specified for the cell, which voltage must never be exceeded.

At reduced reactant flow rates, particularly in the hydrogen-oxygen fuel cell in which an excess of hydrogen flowing through the cell removes the by-product water generated therein, the reduced hydrogen flow may be insufficient to remove the generated water vapor, thereby allowing dilution of the electrolyte. When the power demand is subsequently increased, the cell is slow to respond because of the electrolyte dilution.

Moreover, in some fuel cell systems at low cell power, there has been found to be an electrochemical generation of hydrogen in the electrolyte between the electrodes. The bubbles formed in the electrolyte as a result of this gas formation cause a significant performance degradation which is difficult to recover. The introduction of inert gas into the fuel stream has been found to greatly retard this phenomenon.

It is an object of this invention to provide means for limiting the electrical output of a fuel cell while maintaining the total gas pressure therein.

A further object is to provide apparatus for preventing fuel cell output voltage from exceeding a specified maximum limit.

Another object is the provision of by-product removal means in combination with voltage-regulating means to inhibit electrolyte dilution during periods of low power generation.

A further feature is the provision of a cell temperature-regulating capability in combination with a voltage-regulating and by-product removal means.

A still further feature is the capability of voltage regulation over the entire cell operating power range.

An additional feature is the minimizing of cell performance degradation due to electrochemical generation of gas bubbles in the electrolyte during periods of reduced power.

Other features and advantages of this invention will be apparent from the specification and claims, and from the accompanying drawings which illustrate an embodiment of this invention.

FIGURE 1 is a diagrammatic view of the system;
FIGURE 2 is a typical fuel cell performance curve;
FIGURE 3 is an expanded view of a portion of a typical fuel cell.

As shown in FIGURE 1, the fuel cell 2 with contained liquid electrolyte 3, typically an aqueous solution of potassium hydroxide in the hydrogen-oxygen fuel cell, has output leads 4 and 6 from which electrical power is delivered from the cell to the external electrical load 8.

An electrical resistance heater 5 is provided internal of the fuel cell module 1 to provide for increasing the electrolyte temperature, particularly at the commencement of cell operation. The chemical reaction within the fuel cell is exothermic and the cell will, therefore, be thermally self-sustaining during normal operation. A fuel, which in the particular arrangement shown is hydrogen, is supplied from a source 10 through a mixing valve 12, pressure regulator 13, and supply conduit 14 to the fuel cell. Similarly, the oxidant is supplied under pressure from a source 16 through pressure regular 18 and a supply conduit 20 to the fuel cell. Means for venting the oxidant electrode is provided through conduit 21. Inert gas is supplied from source 22 through pressure regulator 23 and supply conduit 25 to the fuel cell module to maintain a predetermined cover gas pressure on the electrolyte.

The inert gas pressure within the cell module may be transmitted to the electrolyte through gas porous electrical insulators 9. Pressure regulators 13 and 18 are adjusted to maintain the pressure of the reactant gases slightly higher than the pressure maintained on the electrolyte by pressure regulator 23. In the cell shown, when dual porosity electrodes are utilized, reactant pressures of 65 pounds per square inch are commonly used with an electrolyte pressure of 60 pounds per square inch. In this way the flow of fuel and oxidant into the cell is assured and the proper interaction of fuel, oxidant and electrolyte will occur within the electrodes. Inert gas is also supplied from source 22 under pressure through conduit 24 to the mixing valve 12.

In normal operation of the fuel cell, the pressure within the fuel electrode 15, which is slightly higher than the pressure of the electrolyte, is controlled by pressure regulator 13. An excess of undiluted fuel is provided to the fuel cell where it is admitted to the negatively charged porous metallic electrodes. More fuel is circulated through the cell than will be utilized in the chemical reaction within the fuel cell and the excess of circulated fuel in passing through the porous electrode carries with it some of the chemical by-product generated therein.

The excess fuel and by-product mixture is discharged from the cell through conduit 30 through regenerator 70 to radiator 32. The radiator serves to cool the exhaust stream and partially condense the water vapor therein. The partially condensed water vapor and excess fuel mixture is discharged from the radiator through conduit 34 to separator 36. The separator may be any of the well-known types for separating liquid from a gas stream, as for example the centrifugal type of Topanelian Patent 2,575,568.

A pump associated with separator 36 returns the excess fuel by means of conduit 38 through regenerator 70 to the fuel supply conduit 14. The pump may be of any well-known type suitable for pumping gas and may be electrically dirven, the power source therefor constituting part of electrical load 8. Make-up fuel sufficient to restore the pressure downstream of pressure regulator 13 will be admitted from source 10 to restore the fuel pressure within the fuel cell to its normal preset value.

The regenerator 70 is placed in the system to maintain the heat balance within the cell. A by-pass 72 is provided around regenerator 70 to reduce the amount of hot exhaust mixture passing through the regenerator. A valve 74 in by-pass 72 regulates the extent of the exhaust mixture by-passing the regenerator. Valve 74 is regulated as a function of cell temperature as sensed by temperature controller 76 located in communication with the exhaust stream in conduit 30. As the temperature in the cell rises, the temperature of the cell exhaust mixture similarly rises. Temperature controller 76, sensing this increase, opens valve 74 decreasing the temperature within regenerator 70 and reducing the heat transfer therein. Less heat is thereby transferred to the fuel recirculated to the cell through the regenerator via conduit 38. Typically the temperature of the fuel cell shown is maintained at 500° F.

A by-pass 40 is provided around radiator 32 to control the amount of water vapor removed from the fuel cell. A valve 42 in line 40 regulates the extent of the exhaust stream by-passing the radiator. In a typical system, valve 42 will be regulated as a function of the water vapor content of the exhaust mixture. A humidity sensitive element 43 in exhaust conduit 30 is set to sense and maintain a constant humidity in the exhaust stream. As the water vapor content of the exhaust increases, the humidiy sensitive device 43, which may be a dew point controller, will close valve 42 in the by-pass line 40 on signal forcing the fuel and water vapor mixture through the radiator, thereby effecting increased water removal in separator 36. Sensors and controllers for humidity regulation are known in the art, typical examples of various types being described in the Chemical Engineer's Handbook, John H. Perry, pp. 2071–2074, Second Edition (1941).

As may be seen in FIGURE 2, the output voltage of the fuel cell increases with decreasing external load. A voltage sensing unit 52 is provided in the electrical system across cell output leads 4 and 6. When the output voltage of the cell reaches a predetermined maximum which is set into the voltage sensing unit by control voltage box 54, a signal is transmitted to the mixing valve 12. Inert gas is admitted into the mixing valve upstream of pressure regulator 13 in response to this signal where it mixes with the fuel entering the mixing valve. The inert gas and fuel mixture is admitted to the fuel cell through the supply conduit 14. The inert components of this inlet gas mixture accumulate in the pores of the porous fuel electrode, thereby partially preventing the active fuel from coming into contact with the active surface of the electrodes. The reduced surface area thus available for the electron exchange within the electrode reduces the voltage output of the cell.

The excess water vapor and inert gas mixture is discharged through conduit 30 through the regenerator or bypass to the radiator 32 and to the separator 36 wherein the liquid and gas separation is effected in the same manner as when the cell is operating normally. Inert gas is pumped from the separator through conduit 38 back into the fuel supply line 14. Make-up fuel is added from the fuel source 10 through the pressure regulator 13 to restore the gas pressure in line 14.

When the external electrical load is restored to its normal condition in response to an increased power demand made upon the cell, the inert gas is vented through the system through vent 56. Valve 57 in vent 56 may be manually or electrically operated to effect venting. As the inert gas is vented to atmosphere, the pressure is reduced in fuel supply line 14. The pressure regulator 13, sensing this decrease in pressure, admits additional fuel to the fuel supply line, thereby increasing the ratio of fuel to inert gas in the system. The reduction of the inert gas concentration reduces the extent of the metallic active surface blanketed by the inert gas within the electrode. More fuel is therefore brought into contact with the electrode and the electrical output of the cell is correspondingly increased.

By this means, since the total gas flow within the system is maintained at all times, the cell temperature control function may operate in its usual manner and the by-product accumulation within the electrolyte is eliminated, even during periods of operation at reduced power.

It is obvious that, in an installation where other means is provided for maintaining the cell temperature constant, as for example by electrical heating elements within the cell, the entire regenerator system may be eliminated.

It is equally obvious that, in systems where conservation of the inert gas and by-product is not necessary, the exhaust mixture from the cell may be discharged through conduit 30 directly to atmosphere. In this arrangement, the exhaust mixture will be vented directly to atmosphere to accomplish the desired water removal. When water removal is not required, the water vapor and inert gas mixture will be recirculated to the fuel system by a pump operating only when vent valve 57 is closed. In this system the radiator could be eliminated and the combined pump-separator could be replaced by a pump.

It is to be understood that the invention is not limited to the specific embodiment herein illustrated and described but may be used in other ways without departure from its spirit as defined by the following claims:

I claim:
1. In a fuel cell system, a fuel cell, means for separately supplying oxidant and fuel under pressure to said cell, combined voltage-regulating and by-product removal means therefor comprising, a voltage sensing device responsive to cell voltage, a mixing valve in the fuel supply conduit, an inert gas supply line communicating with said mixing valve, means for introducing said inert gas into said mixing valve in response to a signal from said voltage sensing device, a conduit for exhausting the by-product and inert gas mixture from said cell, a heat exchanger for cooling said by-product and inert gas mixture, a separator for removing the by-product from said mixture, a pump for returning the inert gas mixture to said fuel supply conduit, a bypass for the inert gas mixture around the heat exchanger, valve means for controlling the amount of inert gas mixture bypassing the heat exchanger, and means for venting said separator including valve means for controlling said venting.

2. The system of claim 1 in which the valve means for controlling the amount of inert gas bypassing the heat exchanger is responsive to the humidity of the exhaust gas mixture.

3. The method of limiting the output voltage of a hydrogen-oxygen fuel cell and limiting the water accumulation therein comprising, introducing hydrogen and oxygen feed to said fuel cell, adding a substantially inert gas to the hydrogen feed when the output of the cell exceeds a predetermined maximum voltage, admitting said inert gas and hydrogen mixture into said cell at the anode, circulating said inert gas mixture through the anode to entrain the water vapor produced therein, discharging the gas mixture from the cell, cooling the gas mixture, separating the water from the inert gas mixture, and exhausting the inert gas to atmosphere.

4. The method of limiting the output voltage of a hydrogen-oxygen fuel cell and limiting the water accumulation therein during operation at reduced power comprising, introducing hydrogen and oxygen feed to said fuel cell, adding a substantially inert gas to the hydrogen feed when the voltage output of said cell exceeds a predetermined maximum, admitting said inert gas and hydrogen mixture into said cell at the anode, circulating said mixture through the anode to entrain the water vapor produced therein, discharging the gas mixture from the cell, cooling the gas mixture to condense the water vapor, separating the water from the inert gas mixture, reinjecting the inert gas under pressure into the hydrogen supply line and venting the inert gas in response to an increased power demand.

5. In a fuel cell system, a fuel cell, means for separately supplying oxidant and fuel under pressure to said cell, combined voltage-regulating, temperature control and by-product removal means therefor comprising, a voltage sensing device responsive to cell voltage, an inert gas supply line communicating with said fuel supply means, means for introducing said inert gas into said fuel supply means in response to a signal from said voltage sensing device, a conduit for exhausting the by-product and inert gas mixture from said cell, a regenerator in said exhaust conduit, a by-pass for the exhaust mixture around said regenerator, valve means for controlling the volume of the exhaust mixture bypassing the regenerator, a radiator downstream of said regenerator for cooling said exhaust mixture, a separator for removing the by-product from said exhaust mixture, a pump for returning the inert gas mixture to the fuel supply conduit through said regenerator, a bypas for the inert gas mixture around the radiator, valve means for controlling the amount of exhaust mixture bypassing the radiator, and means for venting said separator including valve means for controlling said venting.

6. The system of claim 5 in which the valve means for controlling the volume of exhaust gas mixture bypassing the regenerator is responsive to cell temperature.

7. The system of claim 5 in which the valve means for controlling the amount of exhaust mixture bypassing the radiator is responsive to the water vapor content of the exhaust mixture.

8. The method of limiting the output voltage of a hydrogen-oxygen fuel cell and limiting the water accumulation therein comprising, introducing hydrogen and oxygen feed to said fuel cell, adding a substantially inert gas to the hydrogen feed when the output of the cell exceeds a predetermined maximum voltage, admitting said inert gas and hydrogen mixture into said cell at the anode, circulating said inert gas mixture through the anode to entrain the water vapor produced therein, and discharging the gas mixture from the cell.

References Cited

UNITED STATES PATENTS

| | | | |
|---|---|---|---|
| 2,925,455 | 2/1960 | Eidensohn et al. | 136—86 |
| 2,946,836 | 7/1960 | Justi et al. | 136—86 |
| 2,947,797 | 8/1960 | Justi et al. | 136—86 |
| 3,113,049 | 12/1963 | Worsham | 136—86 |
| 3,198,664 | 8/1965 | Kunz | 136—86 |
| 3,202,546 | 8/1965 | Rightmire et al. | 136—86 |
| 3,239,383 | 3/1966 | Hauel | 136—86 |

ALLEN B. CURTIS, *Primary Examiner.*